(12) United States Patent
Gulick, Jr. et al.

(10) Patent No.: US 11,789,749 B2
(45) Date of Patent: Oct. 17, 2023

(54) AUTOMATIC APPLICATION CONFIGURATOR METHOD

(71) Applicant: Scorpion Security Products, Inc., Vestal, NY (US)

(72) Inventors: Franklyn W. Gulick, Jr., Binghamton, NY (US); Grant William Gulick, Endwell, NY (US); Benjamin Farmer, Syracuse, NY (US)

(73) Assignee: SCORPION SECURITY PRODUCTS, INC., Vestal, NY (US)

( * ) Notice: Subject to any disclaimer, the term of this patent is extended or adjusted under 35 U.S.C. 154(b) by 446 days.

(21) Appl. No.: 17/153,407

(22) Filed: Jan. 20, 2021

(65) Prior Publication Data
US 2022/0027170 A1 Jan. 27, 2022

Related U.S. Application Data

(60) Provisional application No. 63/054,559, filed on Jul. 21, 2020.

(51) Int. Cl.
*G06F 9/00* (2006.01)
*G06F 9/445* (2018.01)
(Continued)

(52) U.S. Cl.
CPC ............ *G06F 9/44505* (2013.01); *G06F 8/65* (2013.01); *G06F 9/451* (2018.02);
(Continued)

(58) Field of Classification Search
CPC ........ G06F 9/44505; G06F 8/65; G06F 9/451; G06F 11/1433; G06F 11/1469;
(Continued)

(56) References Cited

U.S. PATENT DOCUMENTS

| | | | |
|---|---|---|---|
| 7,797,693 B1 * | 9/2010 | Gustafson | G06F 11/1433 711/100 |
| 2003/0225986 A1 * | 12/2003 | Teshima | G06F 8/65 714/E11.135 |

(Continued)

OTHER PUBLICATIONS

European Patent Office, International Searching Authority, dated Dec. 20, 2021, dated Apr. 1, 2022, 13 pages.

*Primary Examiner* — Volvick Derose
(74) *Attorney, Agent, or Firm* — Barclay Damon LLP (57) ABSTRACT

An automatic application configurator method. The method includes connecting a configurator program to a device installed with a first operating system; presenting a graphical user interface comprising a plurality of device details; initiating a configuration process; backing up the device to a backup file local to the configurator program; presenting a graphical user interface comprising a plurality of firmware versions; receiving a selection of a selected firmware version from the plurality of firmware versions; validating that the selected firmware version is available, and responsive to the selected firmware version not being available local to the configurator program, downloading the selected firmware version from an external system; updating the device to a second operating system without erasing any user data of the device; restoring the device using the backup file; supervise (Continued)

the device with an application; enrolling the application with a server; and restoring the device with the first operating system.

17 Claims, 11 Drawing Sheets

(51) Int. Cl.

| | |
|---|---|
| *G06F 8/65* | (2018.01) |
| *G06F 9/451* | (2018.01) |
| *G06Q 30/02* | (2023.01) |
| *G06F 11/14* | (2006.01) |
| *H04W 4/021* | (2018.01) |
| *H04L 67/00* | (2022.01) |
| *H04W 4/029* | (2018.01) |
| *G08B 21/18* | (2006.01) |
| *G06F 8/61* | (2018.01) |
| *G06F 3/0484* | (2022.01) |
| *G06F 3/0482* | (2013.01) |

(52) U.S. Cl.
CPC ...... *G06F 11/1433* (2013.01); *G06F 11/1469* (2013.01); *G06Q 30/02* (2013.01); *H04L 67/34* (2013.01); *H04W 4/021* (2013.01); *H04W 4/029* (2018.02); *G06F 3/0482* (2013.01); *G06F 3/0484* (2013.01); *G06F 8/61* (2013.01); *G06F 2201/805* (2013.01); *G08B 21/18* (2013.01)

(58) Field of Classification Search
CPC ........ G06F 3/0482; G06F 3/0484; G06F 8/61; G06F 2201/805; G06F 11/1448; G06F 21/572; G06F 21/88; G06F 8/63; G06F 9/4406; G06Q 30/02; H04L 67/34; H04W 4/021; H04W 4/029; H04W 4/50; G08B 21/18; G08B 21/0269; G08B 13/1409

USPC ............................................................ 713/1
See application file for complete search history.

(56) References Cited

U.S. PATENT DOCUMENTS

| | | | | |
|---|---|---|---|---|
| 2008/0098381 | A1* | 4/2008 | Lin .......................... | G06F 8/65 717/168 |
| 2010/0313194 | A1* | 12/2010 | Juneja ....................... | G06F 8/65 717/171 |
| 2010/0325622 | A1* | 12/2010 | Morton ................... | G06F 8/654 713/2 |
| 2011/0126043 | A1* | 5/2011 | Anderson .......... | G06F 11/1433 714/6.1 |
| 2012/0124567 | A1* | 5/2012 | Landry ................... | G06F 8/654 717/168 |
| 2013/0125107 | A1* | 5/2013 | Bandakka .......... | G06F 11/1433 717/171 |
| 2014/0109071 | A1* | 4/2014 | Ding ....................... | G06F 8/654 717/168 |
| 2014/0173328 | A1* | 6/2014 | Dasari ................ | G06F 11/0736 714/2 |
| 2015/0277934 | A1* | 10/2015 | Zhang .................... | G06F 9/5077 713/2 |
| 2015/0347153 | A1* | 12/2015 | Chou .................... | G06F 3/0683 713/1 |
| 2016/0202964 | A1* | 7/2016 | Butcher ................. | G06F 8/654 717/172 |
| 2016/0242024 | A1 | 8/2016 | Karren et al. | |
| 2019/0243631 | A1* | 8/2019 | Sharma ................. | G06F 21/572 |
| 2019/0373477 | A1 | 12/2019 | Gulick, Jr. | |
| 2020/0272738 | A1* | 8/2020 | Shroff ................ | G06F 11/1433 |
| 2021/0334765 | A1* | 10/2021 | Nottingham ............ | G06F 21/34 |
| 2022/0360608 | A1* | 11/2022 | Raleigh ............... | H04L 47/2408 |
| 2022/0382420 | A1* | 12/2022 | Ishihara .................. | G01J 3/463 |
| 2023/0043303 | A1* | 2/2023 | Lee ........................ | G06F 9/4401 |
| 2023/0125892 | A1* | 4/2023 | Albright .................. | G06F 8/65 713/1 |
| 2023/0136675 | A1* | 5/2023 | Han ......................... | G06F 8/65 717/168 |

* cited by examiner

AUTOMATIC APPLICATION CONFIGURATOR METHOD

CROSS-REFERENCE TO RELATED APPLICATIONS

This application claims priority to U.S. Provisional Patent Application Ser. No. 63/054,559, filed Jul. 21, 2020, which is incorporated herein by reference in its entirety.

BACKGROUND

Retailers sell handheld electronic devices to the public in a range of shapes and sizes, with a range of functionality. Encouraging customers to examine and use the functionality of the devices at display locations is a valuable marketing technique employed by retailers. To decrease the risk of theft associated with this marketing strategy, retailers employ various security measures.

One common security measure is the use of an alarm sensor that is placed in contact with the surface of the handheld electronic device and alarms when it loses contact with the device (e.g., when the sensor is removed). A typical alarm sensor is attached to one portion of the handheld electronic device using an adhesive tape or similar adhesive product. During use, the adhesives often fail, resulting in the alarm sensor losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm sensors are only activated when the alarm sensor loses contact with the portion of the handheld electronic devices to which it has been attached. For example, if the alarm sensor is attached to the battery cover of a wireless phone, a thief can remove and steal the remainder of the wireless phone (i.e., all components but the battery cover) without activating the alarm sensor. In order to combat this, retailers often install a plurality of alarm sensors in multiple locations on the handheld electronic devices (e.g., front and back, inside the battery compartment, etc.). These alarm sensors often hinder customer inspection of the device. In some cases, these alarm sensors installed within the handheld electronic devices can ignite when subjected to excessive heat within the devices.

Conventional techniques for tracking individual electronic devices are not scalable, and are not amenable to monitoring and managing thousands of devices scattered across hundreds of locations in a geographic area.

SUMMARY

In one embodiment, presented herein is an application configurator method for deploying a security application or other application on a plurality of mobile devices and preserves features of a retail-mode mobile device operating system. In one embodiment, the method includes connecting a configurator program to a device installed with a first operating system; backing up the device; updating the device to a second operating system; supervise the device with an application; enrolling the application with a server; and restoring the device with the first operating system.

In another embodiment, presented herein is an automatic application configurator method. The method includes connecting a configurator program to a device installed with a first operating system; presenting a graphical user interface comprising a plurality of device details; initiating a configuration process; backing up the device to a backup file local to the configurator program; presenting a graphical user interface comprising a plurality of firmware versions; receiving a selection of a selected firmware version from the plurality of firmware versions; validating that the selected firmware version is available, and responsive to the selected firmware version not being available local to the configurator program, downloading the selected firmware version from an external system; updating the device to a second operating system without erasing any user data of the device; restoring the device using the backup file; supervise the device with an application; enrolling the application with a server; and restoring the device with the first operating system.

In a further embodiment, a system is presented, where the system is for automatic application configuration comprising a configurator program and a device installed with a first operating system wherein the configurator program performs an automatic application configurator method.

BRIEF DESCRIPTION OF THE SEVERAL VIEWS OF THE DRAWINGS

A more particular description of the invention briefly summarized above may be had by reference to the embodiments, some of which are illustrated in the accompanying drawings.

Thus, for further understanding of the nature and objects of the invention, references can be made to the following detailed description, read in connection with the drawings in which.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The present disclosure relates to a configurator program for installing applications on a plurality of mobile devices. In some cases, a given operating system will not allow certain or any applications to be installed, and advantageously, the present disclosure provides a technique that can automatically change the operating system such that a supervision application can be installed, and then revert to the original operating system. As another advantage, retail stores may sell numerous different models and brands of devices, and the present technique allows for multiple vendors, OS types, and brands to all work together with a common configurator program and under common supervision. One example of a supervision program that may be used with the present technique is described in commonly assigned U.S. Pat. No. 10,708,785, issued Jul. 7, 2020, which is incorporated herein in its entirety.

Figure 1A:
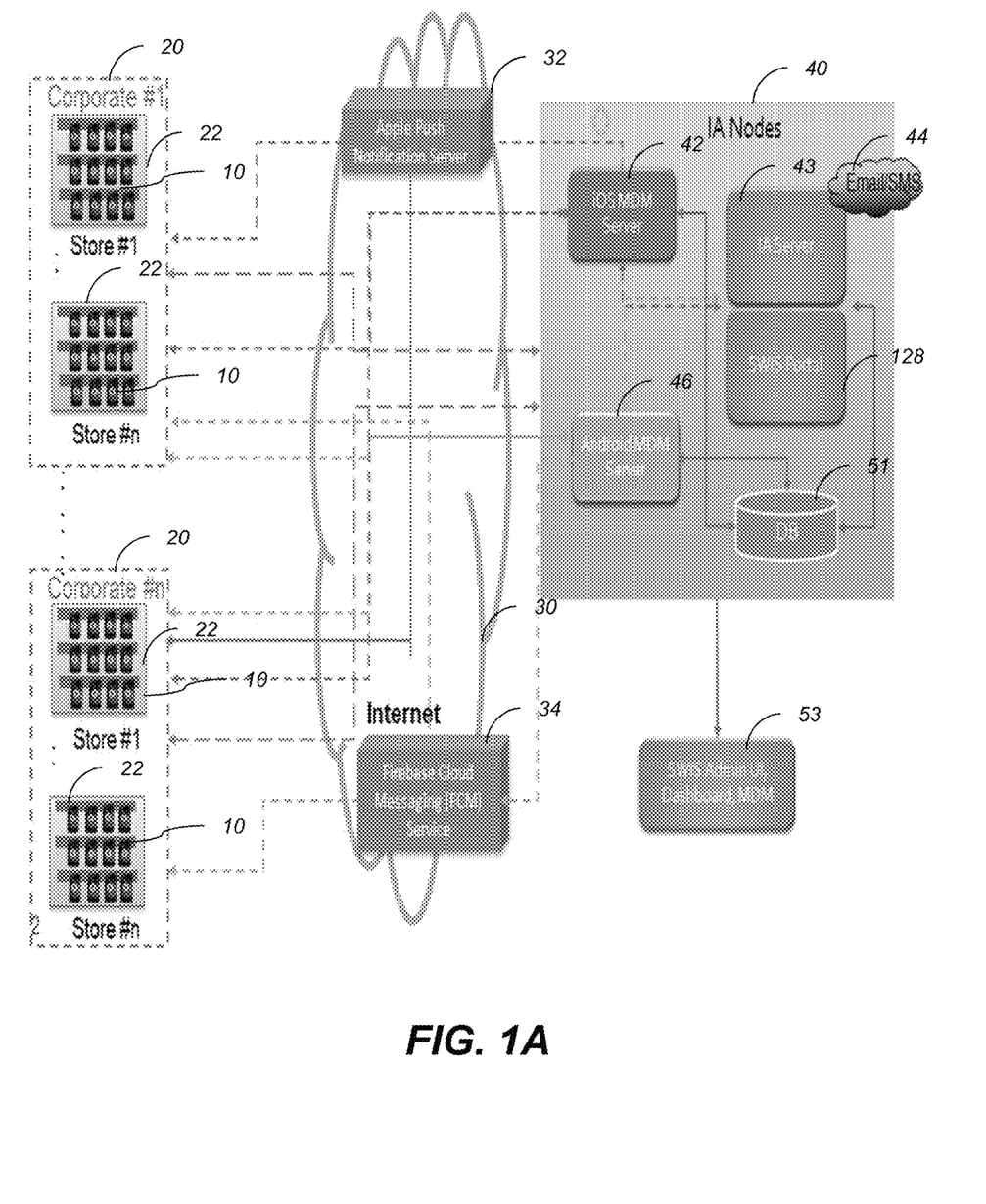
FIGS. 1A-1C are high-level diagrams showing the components of an embodiment of a system for managing mobile devices, in accordance with one or more embodiments set forth herein.
Figure 1B:
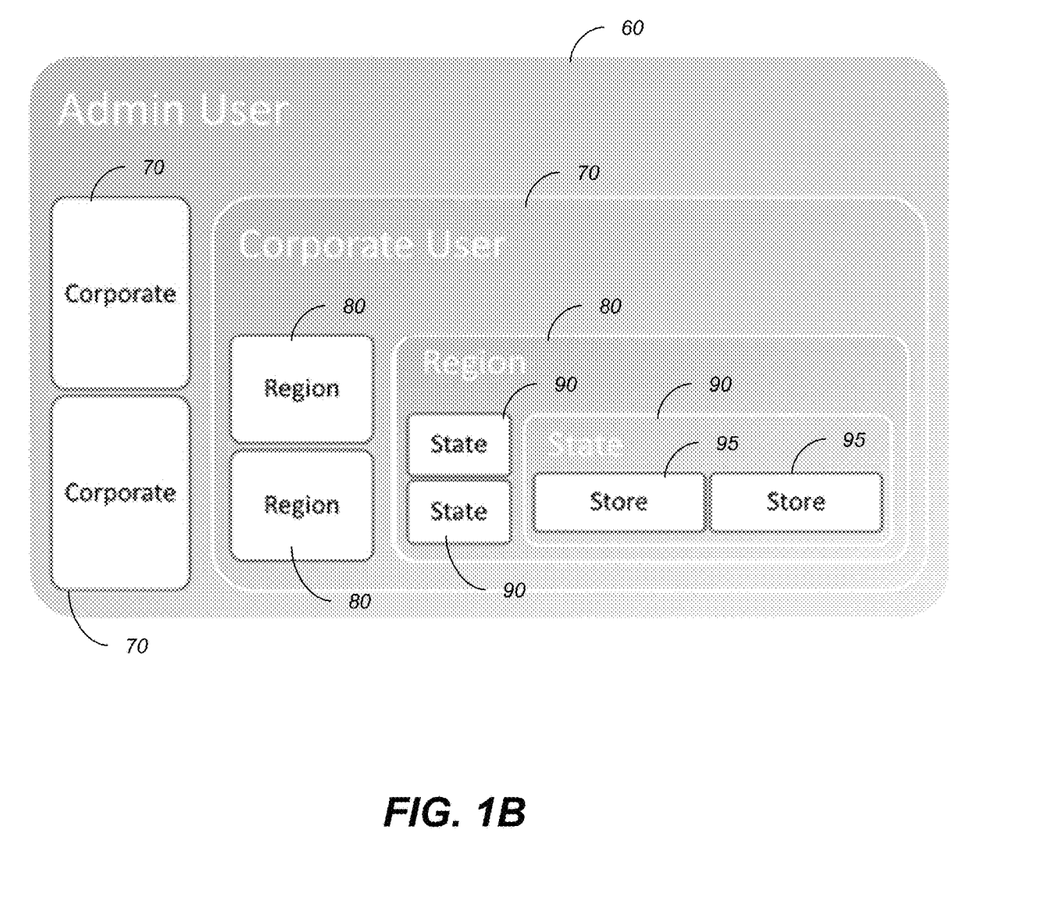

FIG. 1A is a high-level diagram of the end-to-end architecture of a mobile device management system such as a mobile device security system. In the embodiment of FIG. 1A, the system generally includes corporate sites 20 having stores 22 which have numerous mobile devices 10 under management. The system connects via a network 30 with a push notification server 32, a cloud messaging service 34, and intelligent agent nodes 40. Each node 40 includes mobile device management servers 42, 46, an intelligent agent 43, an email/SMS capability 44, a system server 128, a database 51, and configuration user interface 53.

Turning next to the administrative multi-tenant user model of the server 128, the hierarchy of user accounts includes admin users 60, corporate users 70, regions 80, states 90, and stores 95.

Figure 1C:
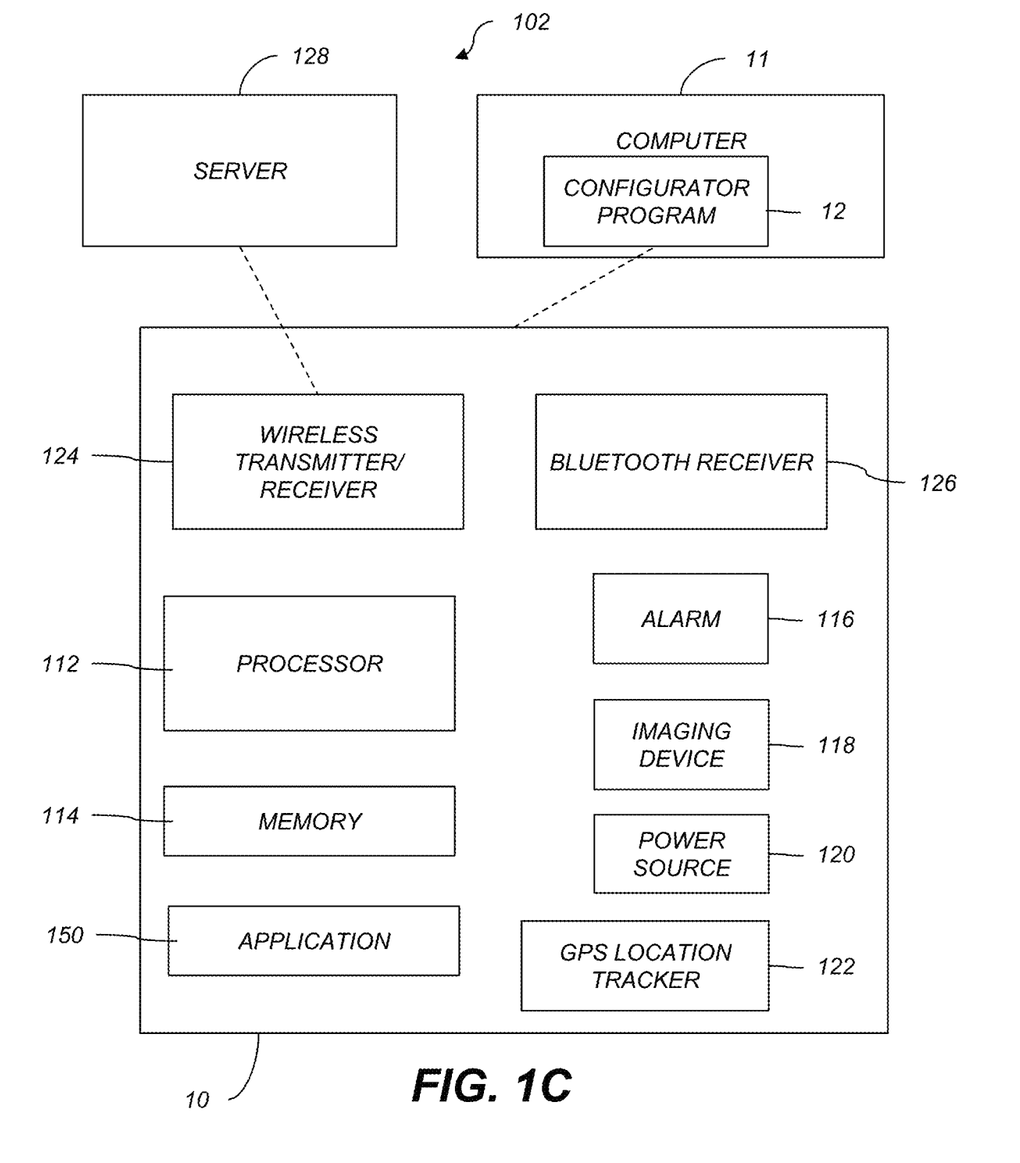

FIG. 1C is a high-level diagram of a mobile device management (or security) system 102. The system 102 includes a mobile device 10, such as a cellular phone or tablet, among others, and a configurator computer 11 running a configurator application 12. Computer 11 may be a laptop or desktop computer, such as a MacBook or other computer running Mac OS. The configurator application 12 may be a program or routine running on the computer 11 which is capable of communicating with one or more mobile devices 10.

While the system 102 is illustrated as including a single mobile device 10, it is to be understood that the security system 102 can include a plurality of mobile devices 10. In an embodiment, the mobile device 10 is a display model for a retail store. The mobile device 10 includes a processor 112 and memory 114. The memory 114 can be any suitable type of memory.

In addition, the mobile device 10 can include an imaging device 118. The imaging device 118 can be any suitable type of device including a still-shot camera, a video camera, or a combination thereof. The mobile device 10 can include a front-facing imaging device, a rear-facing imaging device, or a combination thereof.

The mobile device 10 includes a power source 120, such as a battery. For example, the power source 120 can be a lithium-ion battery. The power source 120 can be recharged via a charging cable coupled to an interface port (not shown) of the mobile device 10.

In addition, the mobile device 10 includes an alarm 116. The alarm 116 can be any suitable type of alarm. For example, the alarm can be an audible alarm, a visual alarm, or a combination thereof. In addition, the alarm 116 can be activated for a variety of reasons, as will be further discussed below. In an example, the alarm 116 can include different levels, such as different tones or different colors, depending on the reason the alarm 116 was activated. The alarm 116 can be activated when the mobile device 10 enters an alarm mode (also known as an alert mode). In addition, the alarm 16 can be activated when a charging cable is disconnected from the power source 120. In an example, when the alarm 116 is activated due to disconnection of the charging cable, the alarm can be deactivated by use of a password or passcode. In an embodiment, when the alarm 116 is deactivated by use of a passcode, only the sound is disabled, while the mobile device 10 is still monitored.

The mobile device 10 can include a location tracker 122. The location tracker 122 can be used to locate the mobile device 10. In an example, the location tracker 122 is a global positioning system (GPS) device. The location tracker 122 is used to establish a geographical radius, or geo-radius, about the device 10 for the purposes of maintaining security of the device 10.

The mobile device 10 further includes a wireless transmitter/receiver 124 and a Bluetooth receiver 126. In one embodiment, the wireless transmitter/receiver 124 can receive and transmit data via a WiFi connection or a cellular network. In another embodiment, the Bluetooth receiver 126 can both receive and transmit signals via a Bluetooth connection. In further embodiments, receiver 126 and wireless transmitter/receiver 124 may be a single radiofrequency subsystem, or may be a software based radio subsystem operating on the processor 112.

The system 102 may additionally include a server 128. In an embodiment, the server 128 is a security server. The server 128 receives data from the mobile device 10 via the wireless transmitter/receiver 124 or device data service. For example, the mobile device 10 can transmit the current device status, images, alarm data, and location information, among others, to the server 128. In addition, the mobile device 10 can transmit a record of people enabling the alarm 116 or disabling the alarm 116. For example, the mobile device 10 can transmit identifying information, such as a passcode or sign-in information, as well as image data to the server 128. The server 128 can maintain a record of when and who enabled or disabled the alarm 116. In an embodiment, the server 128 can correlate data records with image records. In addition, the server 128 can maintain a record of the cause of each alarm activation.

The server 128 can monitor the mobile device 10. For example, the mobile device 10 can send regular signals to the server 128. When a signal is not received in the server 128, the server 128 can send a signal or ping the mobile device 10 to test responsiveness of the mobile device 10. If the mobile device 10 does not response, the server 128 can create an alarm or notification.

In another embodiment, the receiver 126 is any radiofrequency transceiver, including near field communications, WiFi, cellular communication, etc.

For example, application 150 may be a client for iOS or Android platforms. In one embodiment, communication between the application 150 and the server is via a REST application programming interface (API).

The server 128 may include a web user interface for administration. The server 128 may include an alert framework for local and email alerts, as well as SMS alerts. The server 128 may include an interactive dashboard to view and manage devices, stores & users. For example server 128 may display a live view of all devices 10 on a map and visual display of Safe/Lost status. This display, in one embodiment, includes automated captured image upload on alarm and Admin UI to for browsing by an administrator.

In another example, the server 128 includes WiFi/Bluetooth safety check allows the system to alert if the radio interfaces are no longer available. The server 128 may also include remote ping of individual devices 10, and manual override to cancel alarm states.

A configurator program may be used to install the application 150 on the devices 10. For example, the configurator can supervise so-called "retail operating system" versions of device 10 system software, to allow demonstration mode programming to continue to be available on the devices.

Generally stated, the configurator operates by starting with a "retail operating system" loaded device 10. First, a full backup of the device 10 is performed. The full backup includes a backup of "retail operating system" contents and settings. Next, the device 10 is updated to the latest commercial firmware that allows a supervision process to be installed. Subsequently, the application 150 is loaded onto device 10, e.g., via a golden image that is loaded onto device 10. Then, the application 150 is launched and the device 10 is enrolled and registered with a server, a geo-radius zone is established, etc. Once the device 10 has been configured with the application 150, the device is restored with the "retail operating system" version that had been previously backed up, so that the device will continue to offer demonstration modes for customers.

FIGS. 2A-2H are graphical user interfaces 200A-200H of an automatic application configurator 12. In one example, the computer 11 (FIG. 1C) may be any computer capable of running Mac OS High Sierra 10.13.6 with at least 50 GB space left.

Generally stated, the automatic application configurator 12 operates in several steps, including: Backup of the device 10; Update device 10 to existing firmware without erasing any contents (Needed for 12.3 or newer iOS versions); Perform restore device 10 to make device ready for supervision; Supervise the device 10 and perform manual enrollment to enroll device 10 in server 128; Restore Retail iOS settings and contents; and Download Enroll profile and add it manually via Apple configurator (Needed for 12.3 or newer iOS versions). Those steps will now be described in detail.

Figure 2A:
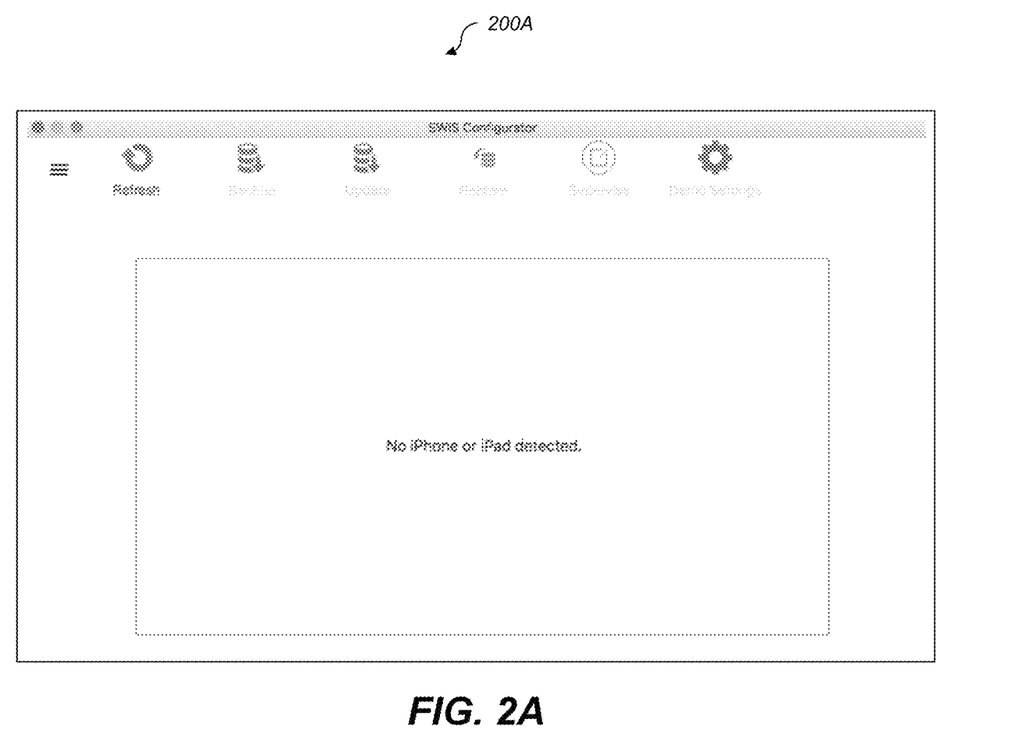
FIGS. 2A-2H are graphical user interfaces of an automatic application configurator, in accordance with one or more embodiments set forth herein.

In the embodiment of FIG. 2A, the configurator 12 runs and presents a graphical user interface 200A. Device 10 is then connected to computer 11, e.g., via a USB port. The refresh button of graphical user interface 200A is clicked so that the configurator can check for a connection to device 10 and ability to get the device details.

Figure 2B:
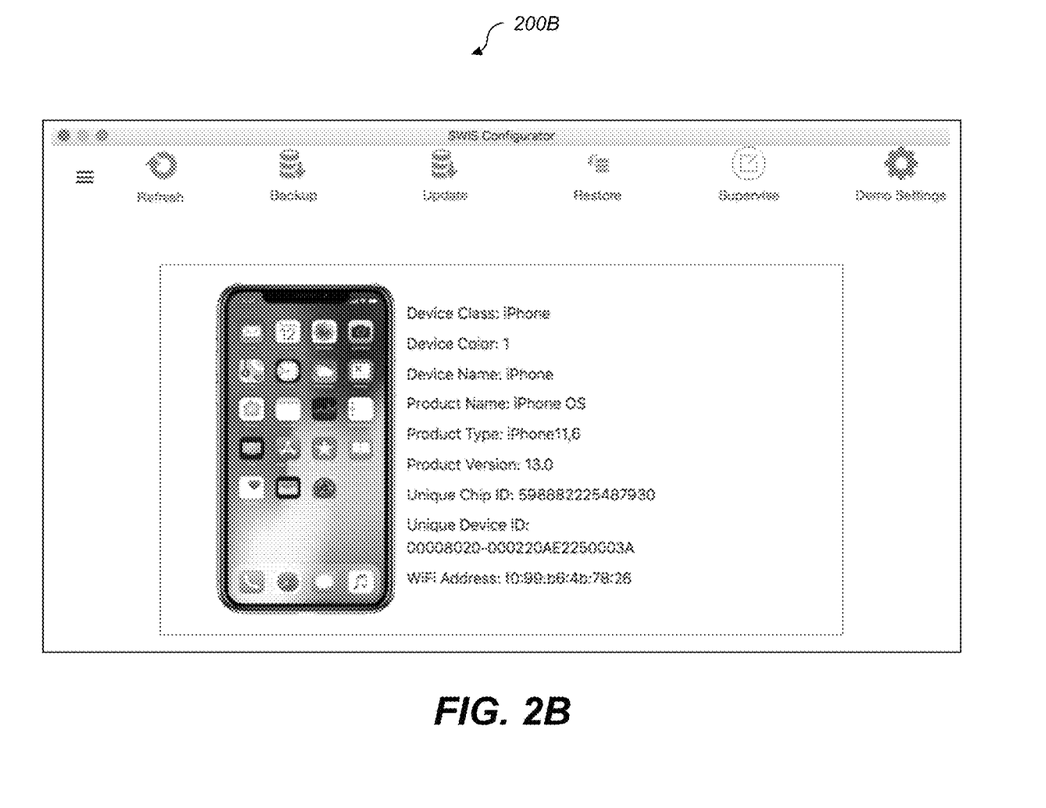

Next, as depicted in FIG. 2B, after connection to the device 10, the configurator 12 presents graphical user interface 200B, showing a plurality of device details.

Figure 2C:
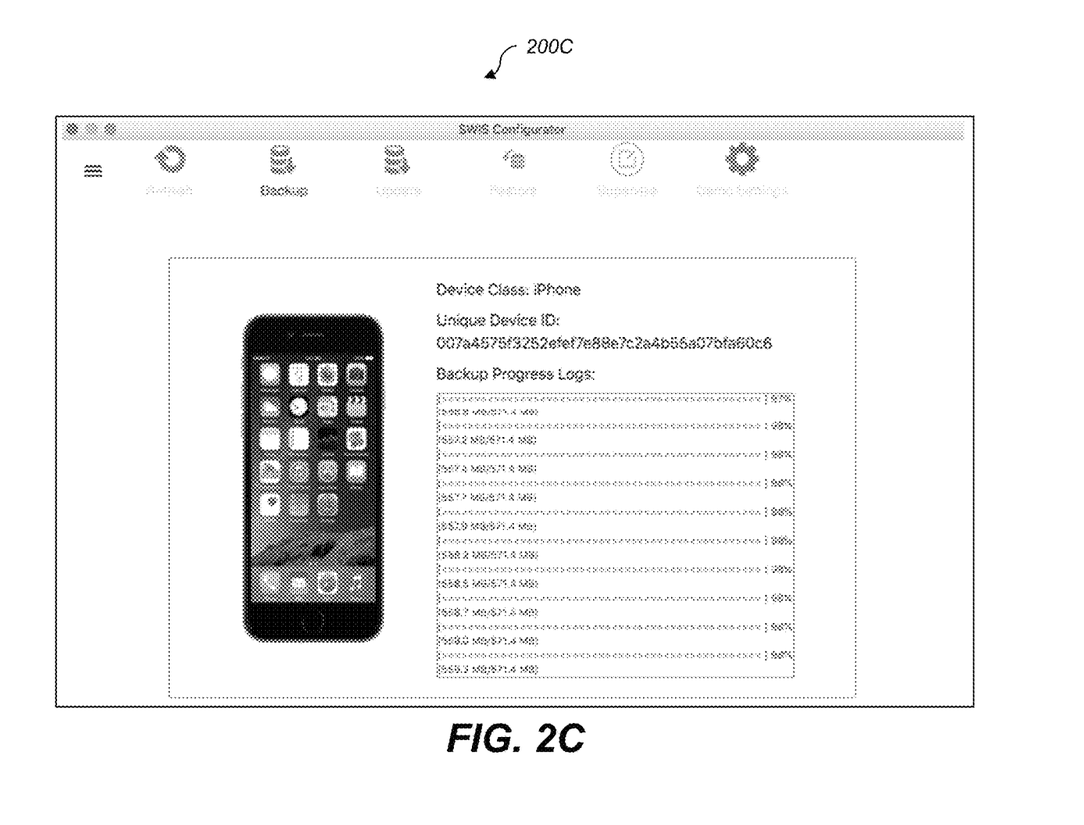

Continuing with the process, as depicted in FIG. 2C, a backup is initiated using graphical user interface 200C. The backup may take 2-5 minutes depending on the content.

Figure 2D:
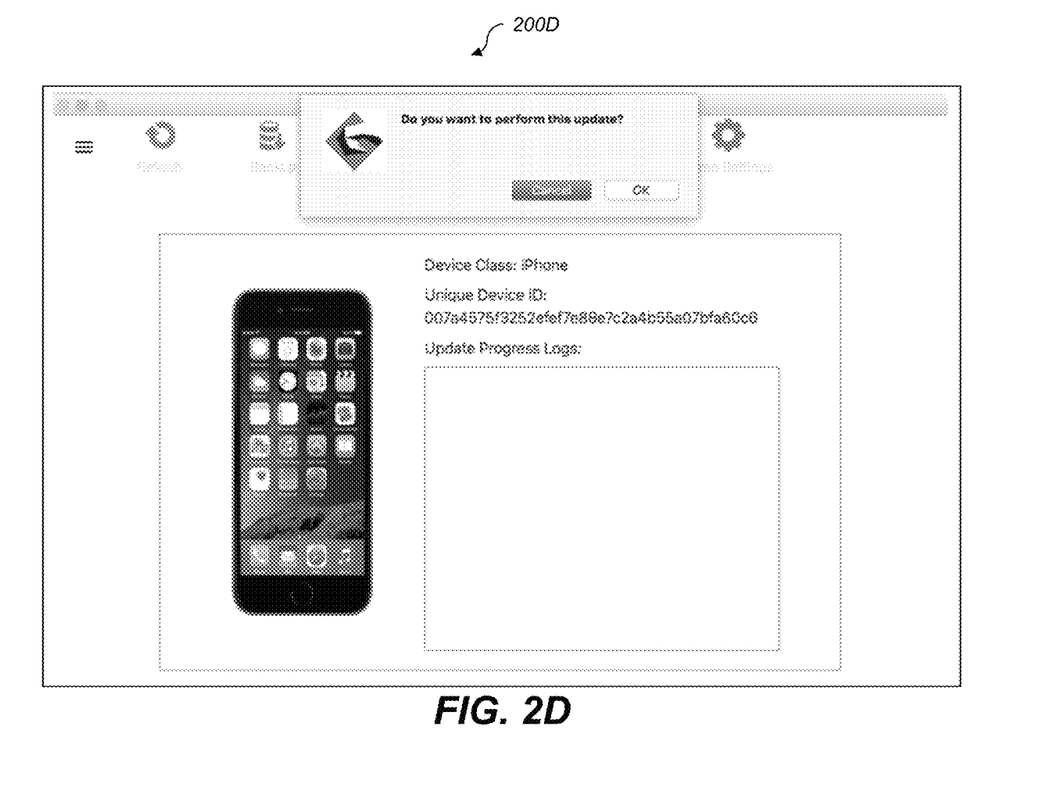

After the backup, as depicted in FIG. 2D, the graphical user interface 200D is used to perform the update. Note that for devices 11 running iOS 12.4 and 12.4.1 this step is needed to update the device firmware to existing version again. Graphical user interface 200D will present the user the ability to select right firmware version e.g. 12.4 or 12.4.1 depending on what device has it once the pop up menu is displayed. The configurator 12 will check if selected firmware is available in Documents folder or not, if not found then the configurator 12 will download, select Documents folder as download location when asked (no other directory). Once downloaded or found the configurator 12 will go ahead and continue to restore the firmware. If an error is observed during this process then the configurator 12 will retry. If the configurator 12 does not recover in 2-3 attempts then the user should contact technical support but not disconnect device 10.

Figure 2E:
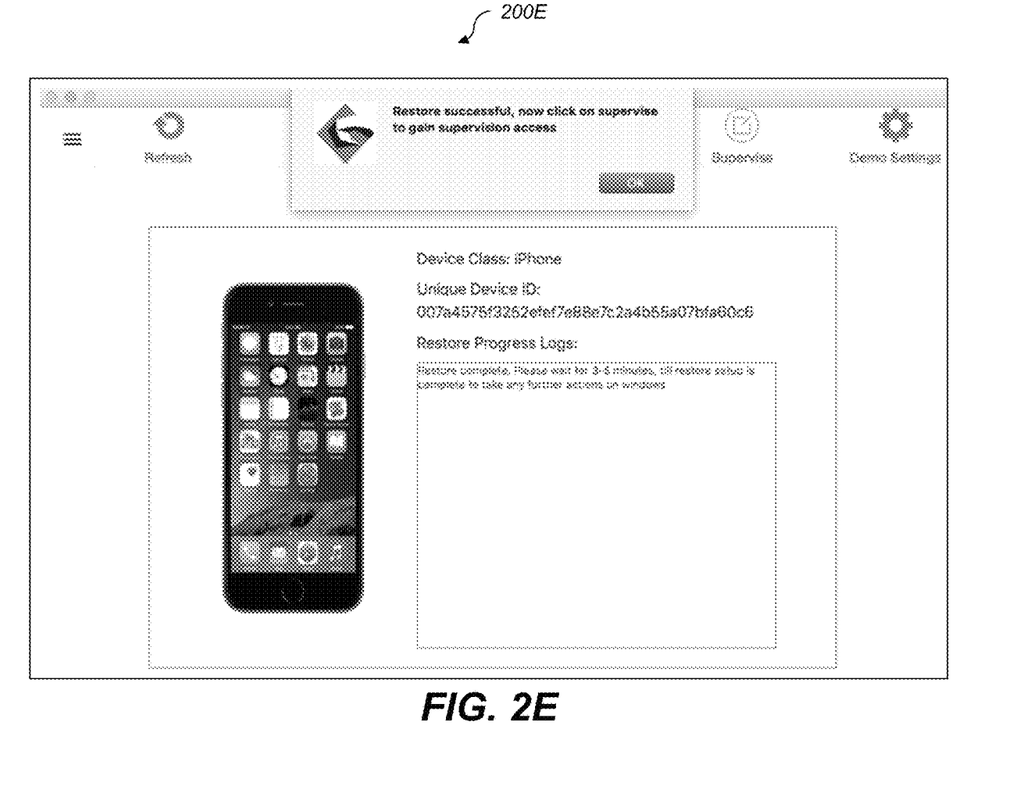

After the update, the device is restored as depicted in FIG. 2E, by the user clicking the Restore button in graphical user interface 200E. After 2-3 minutes, the device 10 will be restored, and the user should click the Refresh button of graphical user interface 200E to ensure that device is connected after restore.

Figure 2F:
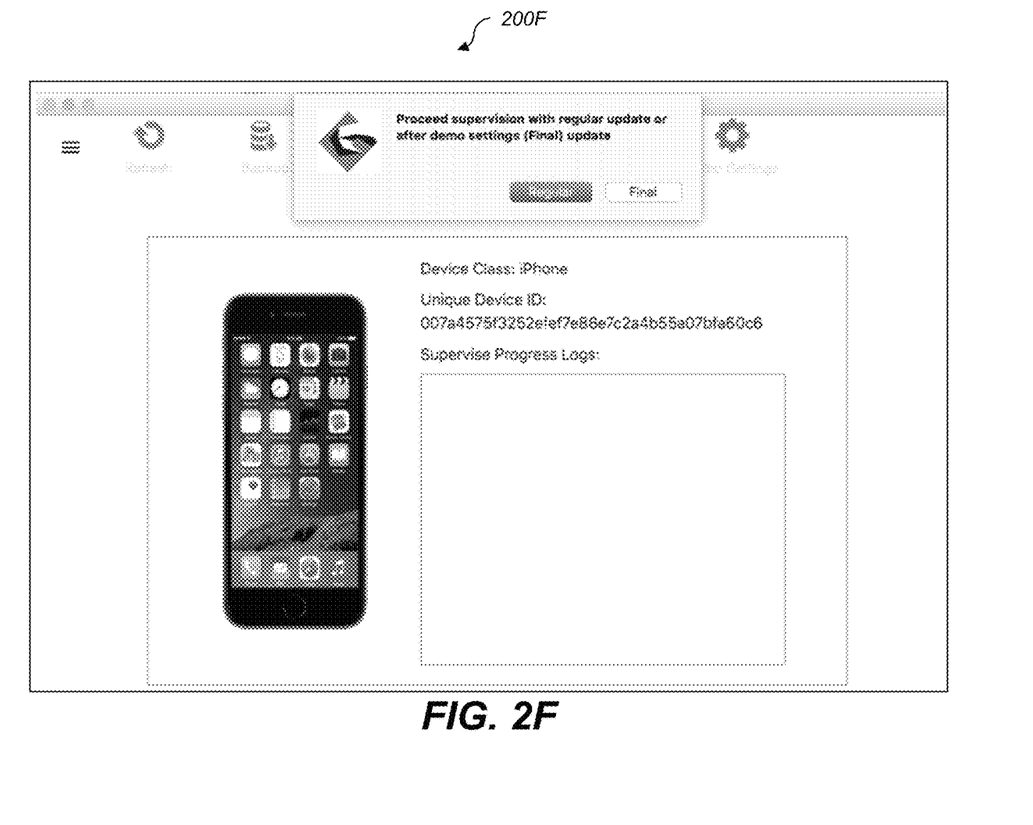
Figure 2G:
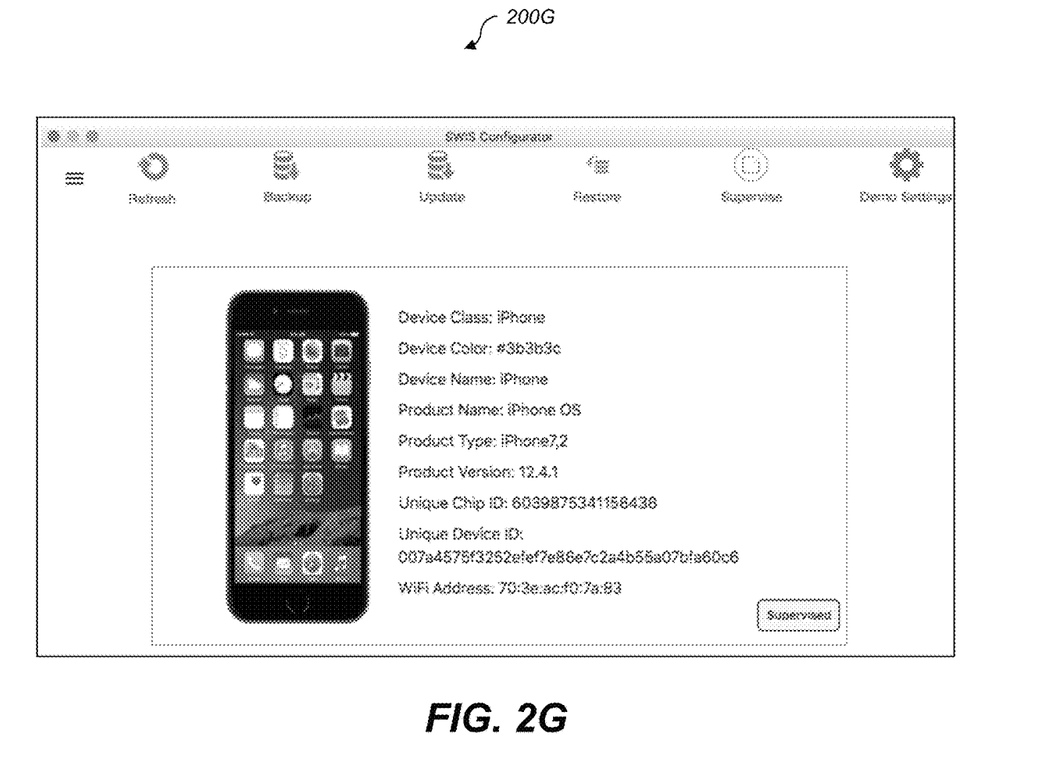
Figure 2H:
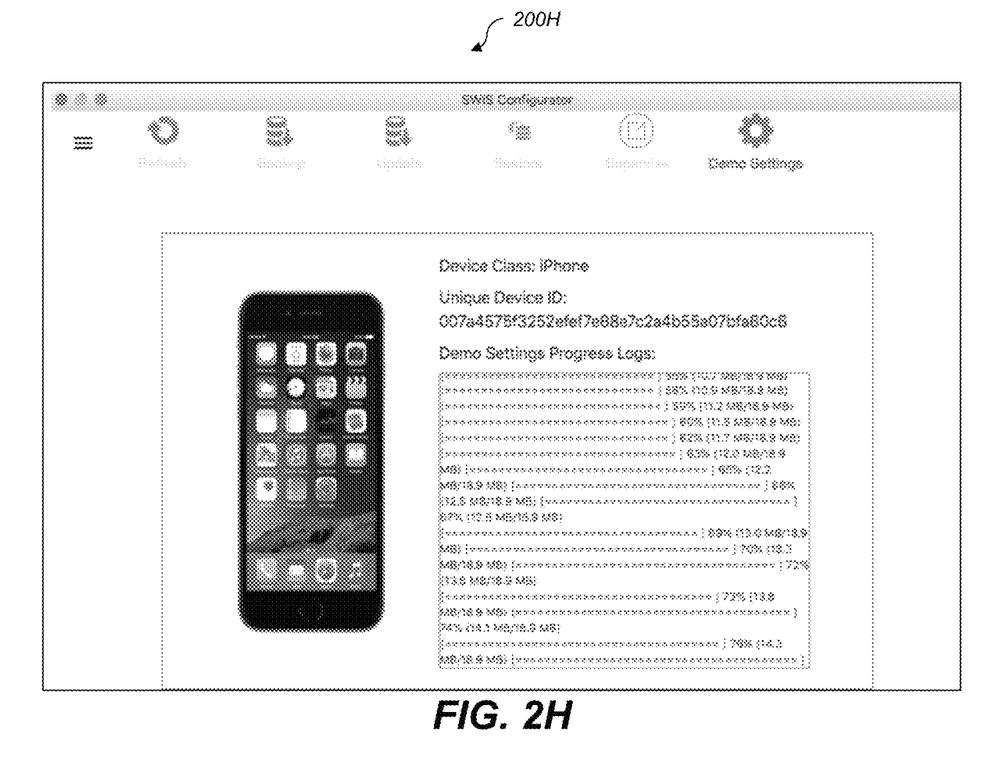

Next, the supervise button of graphical user interface 200E is pressed to perform supervision of device 10, with the confirmation depicted in FIG. 2F, graphical user interface 2G. Finally, as shown in FIG. 2G, the device 10 has been supervised by the application 150, through the use of the configurator 12.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. An automatic application configurator method, the method comprising:
   connecting a configurator program to a device installed with a first operating system;
   presenting a graphical user interface comprising a plurality of device details;
   initiating a configuration process using the graphical user interface;
   backing up the device to a backup file local to the configurator program;
   presenting a graphical user interface comprising a plurality of firmware versions, wherein the plurality of firmware versions presented are selected based on at least one of the plurality of device details;
   receiving a selection of a selected firmware version from the plurality of firmware versions;
   validating that the selected firmware version is available, and responsive to the selected firmware version not being available local to the configurator program, downloading the selected firmware version from an external system;
   updating the device to a second operating system using the selected firmware version without erasing any user data of the device;
   restoring the device using the backup file;
   supervise the device with a supervising application;
   enrolling the application with a server; and
   restoring the device with the first operating system.

2. The method of claim 1, wherein the configurator program is further configured to configure multiple devices, wherein a first device of the multiple devices comprises an Android operating system and a second device of the multiple devices comprises an iOS operating system.

3. The method of claim 1, wherein the configurator program is further configured to perform the method without requiring input to the device.

4. The method of claim 1, wherein the method further comprises presenting an administrative user interface, the administrative user interface providing information related to a plurality of devices being supervised.

5. The method of claim 4, wherein the administrative user interface receives supervision information from each of a plurality of devices being supervised.

6. The method of claim 1, wherein the selected firmware version comprises a retail firmware version, the retail firmware version comprising a demonstration mode of operations of the device.

7. The method of claim 6, wherein the retail firmware version allows supervision of the device simultaneous with a user of the device activating the demonstration mode of the device.

8. The method of claim 1, wherein the supervision of the device comprises tracking whether the device leaves a geo-radius zone established around the device.

9. The method of claim 1, wherein the second operating system allows installation of an application on the device and the first operating system does not allow installation of an application on the device, and the method facilitates installation of the supervising application.

10. A system for automatic application configuration, the system comprising a configurator program and a device installed with a first operating system, wherein the configurator program performs a method comprising the following steps:
    connecting a configurator program to a device installed with a first operating system;
    presenting a graphical user interface comprising a plurality of device details;
    initiating a configuration process using the graphical user interface;
    backing up the device to a backup file local to the configurator program;
    presenting a graphical user interface comprising a plurality of firmware versions, wherein the plurality of firmware versions presented are selected based on at least one of the plurality of device details;
    receiving a selection of a selected firmware version from the plurality of firmware versions;

validating that the selected firmware version is available, and responsive to the selected firmware version not being available local to the configurator program, downloading the selected firmware version from an external system;

updating the device to a second operating system using the selected firmware version without erasing any user data of the device;

restoring the device using the backup file;

supervise the device with an application;

enrolling the application with a server; and restoring the device with the first operating system.

11. The system of claim 10, wherein the configurator program is further configured to perform the method without requiring input to the device.

12. The system of claim 10, wherein the configurator program is further configured to present an administrative user interface, the administrative user interface providing information related to a plurality of devices being supervised.

13. The system of claim 12, wherein the administrative user interface receives supervision information from each of a plurality of devices being supervised.

14. The system of claim 10, wherein the selected firmware version comprises a retail firmware version, the retail firmware version comprising a demonstration mode of operations of the device.

15. The system of claim 14, wherein the retail firmware version allows supervision of the device simultaneous with a user of the device activating the demonstration mode of the device.

16. The system of claim 10, wherein the supervision of the device comprises tracking whether the device leaves a geo-radius zone established around the device.

17. The system of claim 10, wherein the second operating system allows installation of an application on the device and the first operating system does not allow installation of an application on the device, and the method facilitates installation of the supervising application.

* * * * *